June 16, 1964 H. HEUER 3,137,840

OUTPUT ARRANGEMENT FOR DATA PROCESSING MACHINES

Filed June 19, 1962

INVENTOR.
Hans Heuer

BY

Michael S. Striker
Atty

United States Patent Office 3,137,840
Patented June 16, 1964

3,137,840
OUTPUT ARRANGEMENT FOR DATA PROCESSING MACHINES

Hans Heuer, Wilhelmshaven, Germany, assignor to Olympia-Werke A.G., Wilhelmshaven, Germany
Filed June 19, 1962, Ser. No. 203,580
Claims priority, application Germany June 19, 1961
5 Claims. (Cl. 340—147)

This invention refers to a data processing machine furnishing as a result of its operation first electric signals representing digits and second electric signals representing symbols or functional instructions.

The present invention constitutes an improvement or further development of arrangements described and illustrated in my co-pending application, Serial No. 848,321, filed October 23, 1959, under the title "A Central Intelligence Exchange Arrangement." As explained in greater detail in said co-pending application the digit representing signals appearing at the output terminals of the machine are preceded and followed by selected ones of the electric signals representing symbols or functional instructions. The output means of the machine include selectively operable digit output signal storage means connected with the output terminals for delivering said digital output signals.

The arrangement is such that the individual digit signals or a group of signals representing a plurality of digits of a multi-order number are preceded by an advance signal "VS" or by an instruction signal which represents either the operation "Total" or the operation "Sub-total." The output signals are used either for being recorded, e.g. by being applied to a perforator so as to produce coded perforations in a tape, or by being applied directly to another data processing machine, unless the latter is operated later by sensing the perforations of the tape. Therefore, the advance "VS" serves to prepare the circuits or components of the other machine for the input of either a plus or a minus digit. The instruction signals "Total" or "Sub-total" are designed to start in the other machine the totalizing operation and to cause, if desired, the printing of the transmitted digits which represent a total or a sub-total.

The signals following the transmission of digital signals represent the symbols "plus" or "minus" or the instruction "no calculation" whereby in the other machine the circuits for the corresponding operating magnets $M_+$, $M_-$ or $M_\#$ are closed.

In order to prepare the first machine for the delivery of the above-mentioned signal combinations composed of an advance signal, digital signals and a following signal the output means of the machine comprise according to my co-pending application mentioned above storage means in which the above mentioned first and second electrical signals can be stored selectively by means of a plurality of contact slides movable into positions corresponding to the signal to be stored. Read-out means are provided for reading out from the storage means the stored signals and to cause a corresponding signal output.

As far as the output of said second electric signals is concerned the arrangement according to my above mentioned co-pending application comprises two movable contact slides which may be moved jointly into a plurality of selectable positions. One of these contact slides serves to cause storage of those second electrical signals which are to appear ahead of the digital signals, while the second contact slide member serves to cause storage of those second electric signals which are to appear after the digital signals. The contact means cooperating with the two contact slide members are so connected with the read-out means that during the operation of the latter those signals which are controlled by the one contact slide member are read out before reading out the digital signals while the other signals controlled by the second contact slide member are read out after the digital signals.

It has been found desirable to improve and to simplify the above-mentioned output means for the second electric signal representing symbols or functional instructions.

It is therefore one object of this invention to provide for output means which have a smaller number of components than the known devices.

It is another object of this invention to provide for output means of this type which require substantially less space in the data processing machine and therefore make it possible either to reduce the size of the machine or utilize the saved space for other devices.

It is still another object of the invention to provide for an arrangement as set forth in which a single contact slide member is capable of controlling the storage and delivery of all the second electric signals required in the operation of the machine.

With above objects in view the invention includes, in a data processing machine furnishing as a result of its operation, first electric signals representing digits and second electric signals representing symbols or functional instructions, and including selectively operable digit output signal storage means connected with output means for delivering said digital output signals, in combination, readout means connected with the output signal storage means for sequentially reading out digital output signals therefrom and for causing their delivery from said output means, said read-out means including means for producing at its output auxiliary signals in a predetermined time relation to said digital output signals, and signal distributing means connected with the output of said read-out means for converting said auxiliary signals into selected ones of said second electric signals, said signal distributing means including at least one stationary contact member connected with said output of said read-out means, a bank of stationary output contact members assigned respectively to different ones of said second electric signals, and a single movable switch member movable by the operation of said machine to different selectable positions for connecting in respective positions thereof said stationary contact member with any one of said output contact members so as to convert, depending upon its position, the delivery of a selected one of said auxiliary signals into the output of a selected one of said second electric signals, change-over switch means controllable by a selected other one of said auxiliary signals being provided for causing, when in one position, simultaneous output of a combination of said second electric signals, and when moved by said other selected auxiliary signal into another position, single output of a respectively selected one of said second electric signals.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
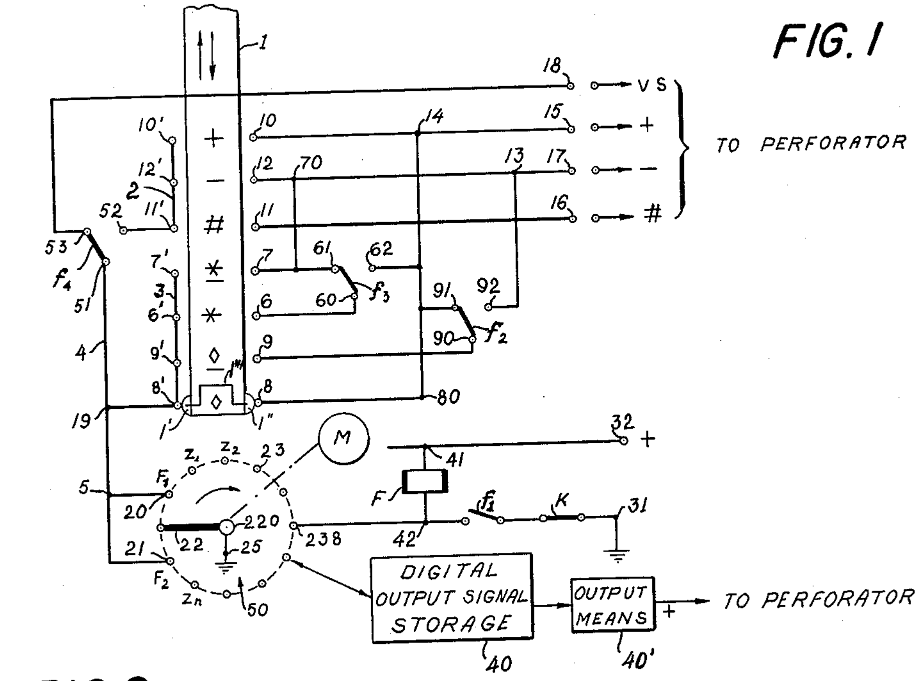
FIG. 1 is a schematic circuit diagram illustrating one embodiment of the invention.

FIG. 1 illustrates a novel signal output arrangement according to the invention, the storage and output means for digital signals being shown only in block form because these means do not constitute part of this invention. The output arrangement for the other signals representing symbols or functional instructions is essentially composed of read-out means 50 and signal distributing means cooperating therewith and characterized by a single slide contact member 1 cooperating with a plurality of stationary contact means. In analogy to the digital output signal storage 40 described in greater detail in my above mentioned co-pending application the combination of the contact slide member 1 with the cooperating contact means may also be called a storage for the above mentioned second electric signal. The member 1 is operable in a well known manner either manually or by a correlated machine operation so as to be set to any one of a plurality of selectable positions each corresponding to a particular signal or signal combination to be delivered at the terminals 15–18 to another machine or for instance to a perforator in the same manner as the digital signals are delivered from the output means 40' to such another machine or perforator.

The read-out device 50 also described in greater detail in my above mentioned co-pending application comprises a contact arm 22 rotatable in the direction of the arrow about its pivot 220 by means of a motor M or some rotating part of the pertaining machine and arranged to engage sequentially a plurality of stationary contacts arranged along a circle concentric with the pivot 220 which is connected by a line 25 with electrical ground or zero potential. Three of these contacts namely 20, 21 and 238 constitute also a part of the signal distributing means and will be explained further below. The remaining contacts of which one is marked by way of example 23 are consecutively assigned to different decimal orders of multi-order numbers that may be stored in the storage 40 and are accordingly individually connected with the corresponding order sections of the storage 40 by lines not shown in FIG. 1. For instance, the contact $Z_1$ is assigned to the first order, the contact $Z_2$ to the second order and so on up to the contact $Z_n$ for the nth order. Since positive potential exists at the output means 40' it is evident that whenever the rotary contact member 22 engages any one of the contacts 23 a circuit is closed between zero potential at the pivot 220 and the positive potential at the output 40' so that in this manner the digital output signals stored in the storage 40 are consecutively read out during the rotation of the contact member 22.

The contact slide member 1 cooperates on one side with a bank of stationary contacts 6–12 and on the other side with two contact bars 2 and 3 diagrammatically illustrated only by a line. The slide member 1 is made of insulating material and carries at its end a contact 1' continuously in engagement with one or the other of the contact bars 2 and 3 and a second contact 1'' adapted to engage in the different positions of the slide member 1 movable longitudinally in the direction of the arrow any one of the stationary contacts 6–12. Contacts 1' and 1'' are connected by a connection 1'''. Consequently when the member 1 is moved into any one of these positions the respective stationary contact 6–12 will be connected with the corresponding contact points 6'–12', respectively, on the contact bars 2 and 3. The different stationary contacts 6–12 are assigned to different signals representing symbols or functional instructions as indicated by the juxtaposed signs.

The contacts 20 and 21 are connected with each other at the junction point 5 and the latter is connected by a line 4 with the pivot point 51 of a change-over relay contact $f_4$ which in the shown normal position engages the stationary contact 53 and thereby connects the line 4 with the output terminal 18 assigned to deliver the advance signal VS. However, when the switch member $f_4$ is moved to its second position it engages the stationary contact 52 whereby the contact bars 2 and 3 are connected with each other while the delivery of the advance signal VS is prevented.

The contacts 238 of the device 50 is connected with a terminal 42 of a relay coil F; the other terminal 41 thereof is connected with a terminal 32 carrying positive potential. Consequently, when the contact arm 22 engages the contact 238 arranged along the above mentioned circle midway between the contacts 20 and 21 the relay coil F will be energized. Hereby the relay contacts $f_1$, $f_2$, $f_3$ and $f_4$ are moved from their respective illustrated positions to their respective second positions. The contact $f_1$ closes a connection between the terminal 42 via a normally closed contact K and terminal 31 to ground so that hereby the relay coil F is kept in energized condition after the contact arm 22 has left the contact 238 and until the normally closed contact K is moved to open position by a cooperating member of the pertaining machine.

When the contact arm 22 engages the stationary contact 20 it produces an auxiliary signal $F_1$ which always precedes the subsequently read out digit signals, while the engagement of the contact arm 22 with the stationary contact 21 produces a second auxiliary signal $F_2$ which always follows the sequence of digit signals. The auxiliary signals $F_1$ and $F_2$ are converted into one or the other, or even in to combinations, of the desired second electric signals representing symbols or functional instructions, depending upon the action of the distributing means whereby the signals so obtained are also distributed over the different output terminals 15–18.

As can be seen from FIG. 1 the contacts 10, 11 and 12 are directly connected with output terminals 15, 16 and 17, respectively which are assigned to signals representing +, # and —, respectively. The contact 7 which is assigned to the signal $\underline{*}$ is connected with a junction point 70 in the output line connecting contact 12 with terminal 17 and also with the stationary contacts 61 of the change-over relay contact $f_3$. Contact 6 assigned to the signal * is connected with the pivot 60 of the change-over relay contact $f_3$ so that in the normal positions thereof the contacts 6 and 7 are connected in parallel. However, when the contact $f_3$ is moved to its second position then the contacts 6 is connected with the stationary contact 62 and thereby with a junction point 14 in the output line between the contact 10 and the output terminal 15. The contact 9 is connected with the pivot 90 of the change-over relay contact $f_2$ which in normal position as shown engages the stationary contact 91 so that thereby the contact 9 is also connected with the junction point 14 and thereby with the output terminal 15. When the change-over contact $f_2$ is moved to its second position so as to engage the stationary contact 92 then the contact 9 is connected with a junction point 13 in the output line between contact 12 and output terminal 17. Finally, contact 8 is connected via point 80 with the above mentioned junction point 14 and thereby with the output terminal 15. The contact 9 is assigned to signal $\underline{\diamond}$ and contact 8 is assigned to a signal $\diamond$.

It should be noted that the contact bar 2 on which the contact points 10', 11' and 12' corresponding to the stationary contacts 10, 11 and 12, respectively, are located is assigned only to convert the second auxiliary signal $F_2$, after the contact $f_4$ has been moved into engagement with contact 52 into one of the signals +, # or — depending upon whether the slide member 1 has been placed in the corresponding positions in which contacts 10, 10', or 11, 11', or 12, 12' are connected with each other. On the other hand, the contact bar 3 on which the contact points 6'–9' are located is assigned to convert the first auxiliary signal $F_1$ into signals + and —, while simultaneously advance signal VS is produced and to convert the second auxiliary signal $F_2$ after the relay coil F has been energized and its relay contacts have been moved to second position into signals + and — following the digit signals, depending upon in which position opposite the contacts 6–9 the slide member 1 has been set.

Figure 2:
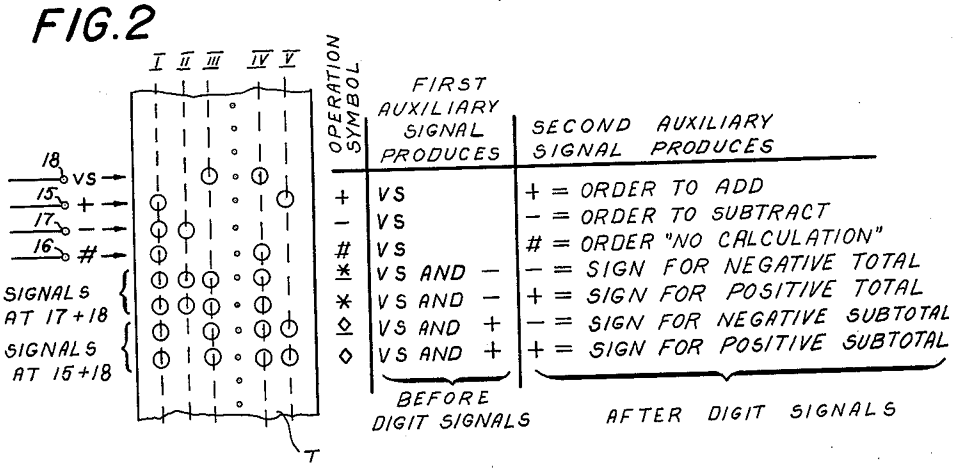
FIG. 2 is a diagram illustrating different coded signals represented by perforations in a tape and a chart explaining the meaning of various signals used in the operation of the arrangement according to FIG. 1.

In order now to explain the operation of the arrangement illustrated by FIG. 1 and assuming that the output signals which become available at the terminals 15–18 are delivered to a perforator punching coded hole combinations into a tape, FIG. 2 illustrates a tape T adapted to receive perforations in different code combinations in five rows I–V. According to the employed code a hole in row III and a hole in row IV represents the advance signal VS. A hole in row I and a hole in row V represents the signal +. A hole in row I and a hole in row II represents the signal —. A hole in row I and one hole in row IV represents the signal # which means "no calculation." A combination of the holes representing the advance signal VS and the holes representing the signal —, i.e. one hole each in the rows I–IV represents the instruction signal "Total," and a combination of the holes representing the advance signal VS and the holes representing the signal +, i.e. one hole each in the rows I, III, IV and V represents the instruction signal "Subtotal."

For better understanding the ends of the output lines and the corresponding output terminals 15–18 as shown in FIG. 1 are placed at the left of the tape T in alignment with the corresponding perforations in the tape. Also at the left of the tape T it is indicated that the perforations represening "Total" are produced when signals appear simultaneously at the outputs 17 and 18, and that the perforations representing "Sub-total" are produced when signals appear simultaneously at the output terminals 15 and 18.

The chart at the right of the tape T is to be interpreted as follows:

In the first column the operation symbols or signals are indicated again in alignment with the corresponding perforations of the tape T at the left thereof. The second column indicates into which signals the auxiliary signal $F_1$ produced before the read-out of the digit signals may be converted, and the third column indicates in a similar manner into which signals the second auxiliary signal $F_2$ appearing after reading out the digit signals may be converted.

The operation of the arrangement according to FIG. 1 will now be described. It may be assumed that the slide contact member 1 is in the illustrated position in which it connects the contact 8 with the contact bar 3 at the contact point 8'.

As explained in greater detail in my above mentioned co-pending application, after the setting of the contact slide member 1 the machine is put into operation whereby now the rotary movement of the contact arm 22 of the read-out device 50 is started. As soon as the arm 22 reaches the contact 20 the contact bar 3 is connected via junction points 19 and 5 and pivot 220 with zero potential which is equivalent to the production of the first auxiliary signal $F_1$ which is now available at the contact point 8' and at the pivot 51 of the change-over contact $f_4$. Thus not only the auxiliary signal $F_1$ is converted into an advance signal VS delivered from the contact 53 to the corresponding output terminal 18, but also the auxiliary signal $F_1$ is converted into the signal + which is delivered from the contact point 8' through contacts 1' and 1'', contact 8, point 80, junction point 14 to the corresponding output terminal 15. Consequently, the output arrangement delivers an instruction signal ◇ which causes the attached perforator to punch in the tape T one hole each in the rows I, III, IV and V which means "Sub-total."

The contact arm 22 continues to scan the contacts 23 for reading out whatever digital signals are stored in the storage 40. However before completing the reading out of the digital signals the contact arm 22 engages the contact 238. Thus the relay coil F is energized and kept in this condition by the now closed relay contact $f_1$. At the same time the relay contacts $f_2$, $f_3$ and $f_4$ are moved to their second positions. As far as the contacts $f_2$ and $f_3$ are concerned their change of position has no effect because the contacts 6, 7 and 9 are not in circuit with the device 50. However, a change of position of the relay contacts $f_4$ has the result that now the output terminal 18 is disconnected. When now after the scanning of the contacts 23 the arm 22 engages the contact 21 the second auxiliary signal $F_2$ is issued and is converted into a signal + which is delivered from contact point 8' via contacts 1' and 1'', contact 8, point 80 and junction point 14 as such a signal at the terminal 15 so that now in the tape T (after the recording of the read out coded digit representations in the form of corresponding holes) two holes in rows I and V are punched by the perforator.

On the other hand, if for instance the contact slide member 1 has been positioned so that it connects the contact 9 with the contact point 9' on the contact bar 3 then the production of the first auxiliary signal $F_1$ would produce an advance signal VS at the output terminal 18 and simultaneously, as in the example described above, an output signal + via contact $f_2$ and junction point 14 at the output terminals 15. This combined signal would again mean "Sub-total." After reading out the stored digital signals from the storage 40 the thereafter produced second auxiliary signal $F_2$ will be converted into a signal — which is delivered from contact 9 via the relay contact $f_2$ in its second position and the junction point 13 at the output terminal 17. Consequently, in this case first a group of holes in the rows I, III, IV and V would be punched in the tape T, thereafter the holes representing the respective digits, and thereafter two holes in the rows I and II indicating that the respective sub-total is negative.

It will be understood readily that in quite a similar manner signals will be produced for ordering and indicating a positive or a negative total if the slide contact member 1 were positioned so as to connect the contact 6 with the contact point 6' or the contact 7 with the contact point 7', respectively.

A similar procedure develops if the contact slide member 1 is positioned so as to connect the contacts 10, 11 or 12 with the corresponding contact points 10', 11' or 12', respectively, on the contact bars 2. Since the contact bar 2 is not connected with the line 4 as long as the relay coil F is not energized and the relay contact $f_4$ is in its illustrated normal position the first auxiliary signal $F_1$ is only converted into the advance signal VS which is delivered at the terminal 18 which only means that the next signal to be transmitted will be a digit signal which may be added to a previously recorded or processed number or subtracted therefrom. However, after during the reading out of the respective digital signals from the storage 40 the contact 238 is engaged and the relay coil F energized with the result of changing the position of its relay contacts the second auxiliary signal $F_2$ produced after the completion of the reading out of the digit signals will be transmitted via the now moved relay contact $f_4$ to the contact bar 2. If before the operation the contact slide member 1 has been moved so as to connect the contact 10 with the contact point 10' the auxiliary signal $F_2$ will now be converted into and issued at the terminal 15 as a signal representing the symbol + indicating that the just processed number is to be added. If, on the other hand, the slide member 1 has been positioned previously so as to connect the contact 12 with the contact point 12' then in the same manner, following the transmission of digit signals, a signal will be delivered at the output terminals 17 indicating that the respective number is to be subtracted. Finally, if the slide member 1 has been previously set to connect the contact 11 with the contact point 11' the signal delivered at the output terminal 16 after the completion of the delivery of a digit signal will indicate "no calculation" meaning that the respective figure is only transmitted without the intention of having it immediately processed further.

It can be seen from the above that by means of the arrangement according to the invention as illustrated by FIG. 1 the output of signals representing symbols or functional instructions is effected in an extremely simple and most efficient manner. In spite of the great variety of different signals and signal combinations to be issued the arrangement comprises a surprisingly small number of simple and reliable components. Therefore the space requirement for this portion of the output means is greatly reduced.

Summing up the operation of the arrangement is as follows:

If before the transmission of digit signals the advance signal VS alone appears then this means that the next signal will be a digit signal or a plurality of digit signals and the signals +, — and # appearing after the digit signals represents the order that the respective digit or number is to be added or subtracted or not to be subjected to any calculating operation, respectively. If, on the other hand, an advance VS appears simultaneously with a signal + preceding the transmission of digit signals then this would represent the order to form a "Subtotal." If the advance signal VS appears simultaneously with a signal — preceding the transmission of digit signals then this would constitute the order to form a "Total." In both last cases the appearance of a signal +, or — after the transmitted digit signals would not constitute an order or instruction but only the indication that the resulting total or sub-total is positive or negative, as the case may be.

Figure 3:
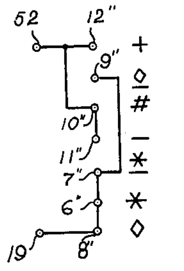
FIG. 3 is a partial circuit diagram illustrating a partial modification of the arrangement according to FIG. 1.

In order to show that the arrangement of the circuitry in FIG. 1 is not the only one that would consitute an embodiment of the invention, FIG. 3 illustrates diagrammatically a portion of the arrangement according to FIG. 1, the contact bars 2 and 3 being replaced by an array of contact points 6″–12″ functionally corresponding exactly to the contact points 6′–12′ of FIG. 1 but connected in a different manner between the contact points 19 and 52, appearing also in FIG. 1. It can be seen therefore that the only condition that matters is that the contact points assigned to the signal +, — and # form one group and are connected with each other while the other contact points assigned to the signals ◇, ◇̲, *̲ and * must form a second group connected with each other.

It will be understood that each of the elements described above or two or more together, may also find a useful application in other types of data processing machines furnishing first and second electric signals representing digits and other information, respectively, differing from the types described above.

While the invention has been illustrated and described as embodied in a data processing machine furnishing first and second electric signals representing digits and other information, respectively, and containing specific read-out and signal distributing means, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a data processing machine furnishing as a result of its operation first electric signals representing digits and second electric signals representing symbols or functional instructions, and including selectively operable digit output signal storage means connected with output means for delivering said digital signals, in combination, read-out means connected with the output signal storage means for sequentially reading out digital output signals therefrom and for causing their delivery from said output means, said readout means including means for producing at its output auxiliary signals in a predetermined time relation to said digital output signals; and signal distributing means connected with the output of said read-out means for converting said auxiliary signals into selected ones of said second electric signals, said signal distributing means including at least one stationary contact member connected with said output of said read-out means, a bank of stationary output contact members assigned respectively to different ones of said second electric signals, and a single movable switch member movable in the course of the operation of said machine to different selectable positions for connecting in respective positions thereof said stationary contact member with any one of said output contact members so as to convert, depending upon its position, the delivery of a selected one of said auxiliary signals into output of a selected one of said second electric signals, changeover switch means controllable by a selected other one of said auxiliary signals being provided for causing, when in one position, simultaneous output of a combination of selected ones of said second electric signals, and when moved by said other selected auxiliary signal into another position, single output of a respectively selected one of said second electric signals, depending upon the position of said single movable switch member.

2. In a data processing machine furnishing as a result of its operation first electric signals representing digits and second electric signals representing symbols or functional instructions, and including selectively operable digit output signal storage means connected with output means for delivering said digital output signals, in combination, read-out means connected with the output signal storage means for sequentially reading out digital output signals therefrom and for causing their delivery from said output means, said read-out means including means for producing at its output a first auxiliary signal preceding the read-out of said digital output signals, a second auxiliary signal in-between said read-out of said digital output signals, and a third auxiliary signal following said readout of said digital output signals; and signal distributing means connected with the output of said read-out means for converting said auxiliary signals into selected ones of said second electric signals, said signal distributing means including a special output means for delivering an advance signal and a first stationary contact member connectable with said output of said read-out means, a second stationary contact member permanently connected with said output of said read-out means, a bank of stationary output contact members assigned respectively to different ones of said second electric signals, and a single movable switch member movable in the course of the operation of said machine to different selectable positions for connecting in respective positions thereof said first stationary contact member with any one of a first group of said output contact members and said second stationary contact member with any one of a second group of said output contact members so as to convert, depending upon its position, the delivery of said first one of said auxiliary signals into output of a selected one of said second electric signals, relay means including changeover switch means and energizable by said second one of said auxiliary signals being provided for connecting, when in one position, said output of said read-out means with said special output means and for causing simultaneous output of a combination of a selected one of said second electric signals with said advance signal, and when moved by said other selected auxiliary signal into another position, by connecting said first and second stationary contact members with each other, in response to said third one of said auxiliary signals single output of a respectively selected one of said second electric signals, depending upon the position of said single movable switch member, excluding said advance signal.

3. An arrangement as claimed in claim 2, wherein said read-out means comprise a selector switch means having a bank of stationary contact means in sequential arrangement and a movable control contact adapted to be moved by a component of the machine along said bank of stationary contact means so as to engage the latter in sequential order, the first and the last one of said bank of contact means constituting said output of said read-out means, a plurality of contact means of said bank thereof being connected with said digit output storage means, and one contact means arranged in-between said plurality of contact means being connected with said relay means.

4. An arrangement as claimed in claim 3, wherein said first stationary contact member and said first group of said stationary output contact members of said signal distributing means are assigned to those of said second electric signals which are to be delivered after the read-out of said digital output signals, a first, second and third output terminal being respectively connected with said first group of stationary output contact members and respectively assigned to signals representing "+", "—" and "no calculation."

5. An arrangement as claimed in claim 4, wherein said second stationary contact member and a first, second, third and fourth one of said second group of said stationary output contact members are assigned to those of said second electric signals which are to be delivered before the read-out of said digital output signals, namely "positive total," "negative total," "positive subtotal" and "negative subtotal," respectively, said second and third one of said second group of output contact members being directly connected to said first and second output terminals, said relay means including a second and third changeover switch means of which said second one normally connects said fourth one of said stationary output contact members with said first output terminal, while said third changeover switch means normally connects said first one of said stationary output contact members with said second output terminal, and when upon energization of said relay means said second and third changeover switch means are moved to second position said second one connects said fourth one of said stationary output contact members with said second output terminal while said third changeover switch means connects said first one of said stationary contact members with said first output terminal.

No references cited.